US00RE34867E

United States Patent [19]

Yamazaki et al.

[11] E Patent Number: Re. 34,867

[45] Reissued Date of Patent: Feb. 28, 1995

[54] AIR CONDITIONER

[75] Inventors: Shusuke Yamazaki, Hiratuka; Yoshinori Katagami, Yokohama; Tomoyasu Shinozaki, Abiko, all of Japan

[73] Assignee: Kabushiki Kaisha Toshiba, Kanagawa, Japan

[21] Appl. No.: 14,803

[22] Filed: Oct. 14, 1993

Related U.S. Patent Documents

Reissue of:

[64] Patent No.: D.319,306
Issued: Aug. 20, 1991
Appl. No.: 541,289
Filed: Jun. 20, 1990

[30] Foreign Application Priority Data

Dec. 22, 1989 [JP] Japan ..... 1-47121

[52] U.S. Cl. ..... D23/351; D23/333

[58] Field of Search ..... D23/351, 333, 314, 328, D23/332, 335, 336; 62/237, 262; 454/233

[56] References Cited

U.S. PATENT DOCUMENTS

D. 299,524 1/1989 Din-Her ..... D23/314
1,933,771 11/1933 Strang et al. ..... D23/351
2,722,810 11/1955 Maniscalco, Sr. ..... 62/262

OTHER PUBLICATIONS

"Pinguino", DeLonghi, Jun. 27, 1989.
House & Home, Apr. 1958, p. 196, Compact Gas-Fired Space Heater, top right side of page.
Electrical Merchandising, Apr. 1947, p. 231, Reznor Gas Fired Unit Heater, bottom left side of page.
"Klimageraet K 18", Aus Erfahrung Gut, published prior to Jun. 1990.
"Cool Mini", Toshiba, Jul. 1982.
"PFR-4001 J" Mitsubishi, Jun. 8, 1979.
"Clean Heater VKC-422E", Mitsubishi, Jan. 1979.

*Primary Examiner*—Lisa P. Lichtenstein
*Attorney, Agent, or Firm*—Banner, Birch, McKie & Beckett

EXEMPLARY CLAIM

CLAIM

The ornamental design for an air conditioner, as shown and described.

DESCRIPTION

Figure 1:
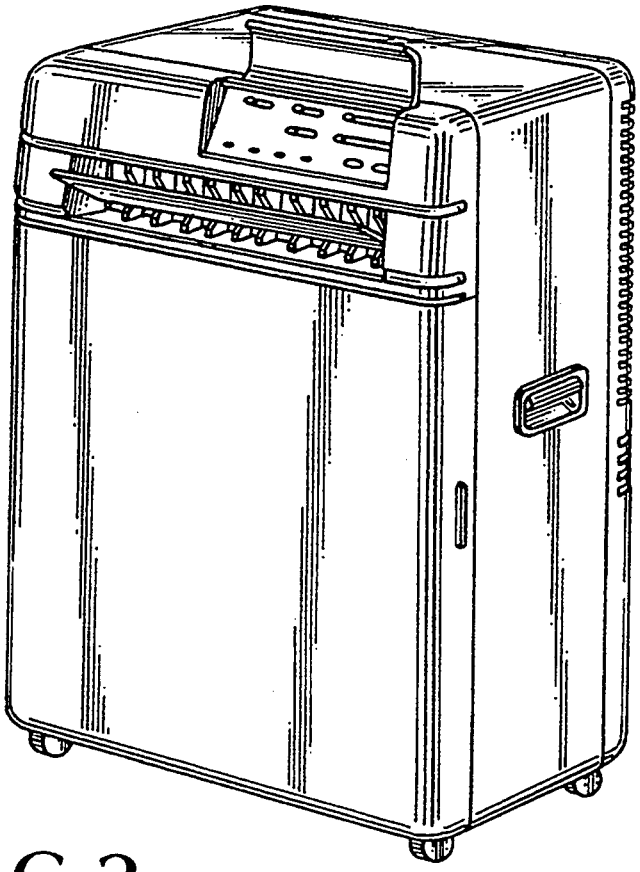
FIG. 1 is a front, top and right side perspective view of an air conditioner showing our new design, with the louver in opened position and the control panel cover in opened position[.]
Figure 2:
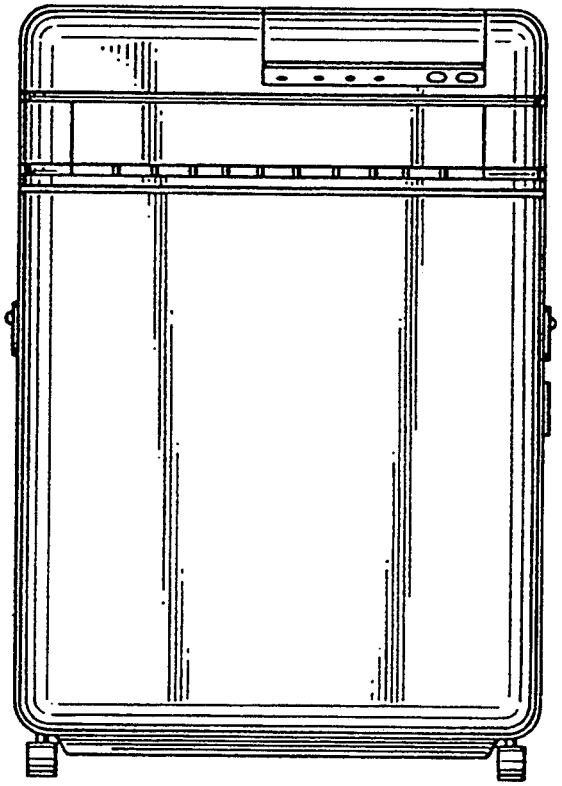
FIG. 2 is a front elevational view thereof with the louvre and control panel cover in closed position.
Figure 3:
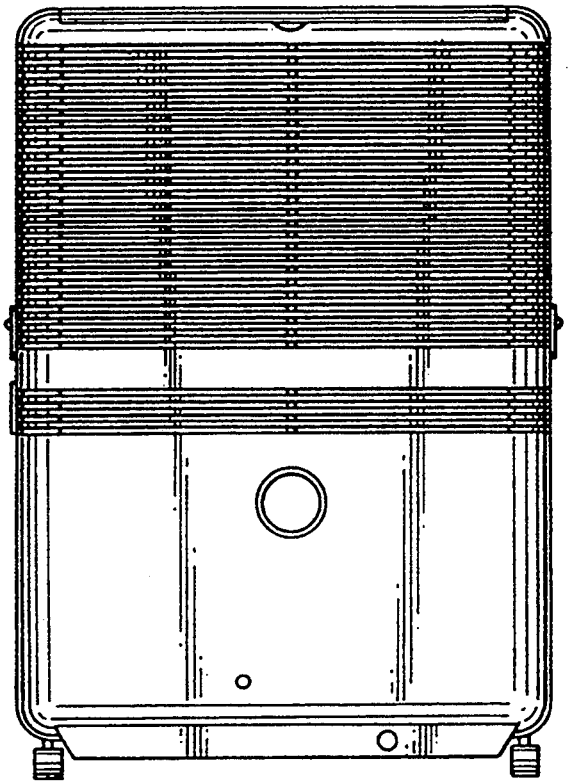
FIG. 3 is a rear elevational view of FIG. 2.
Figure 4:
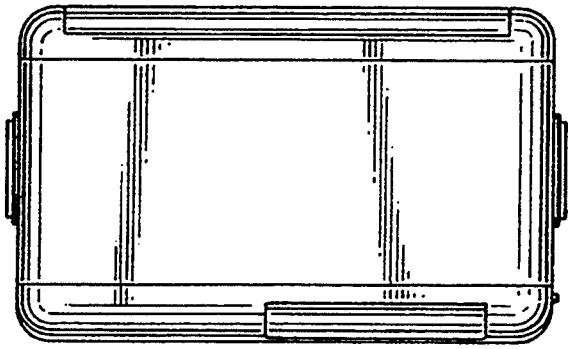
FIG. 4 is a top plan view of FIG. 2.
Figure 5:
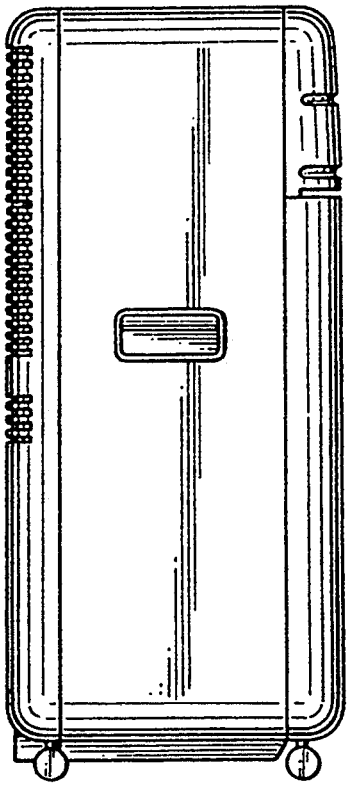
FIG. 5 is a left side elevational view of FIG. 2, the right side being a mirror image of that shown; *and,*
Figure 6:
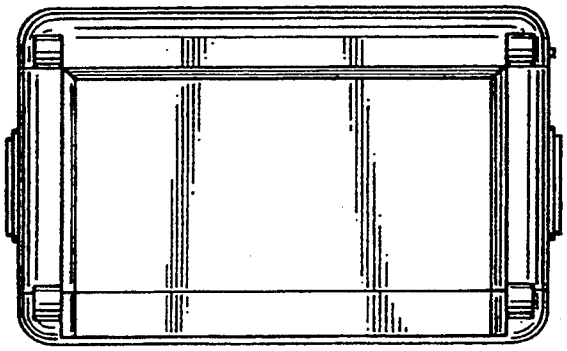
FIG. 6 is a bottom plan view of FIG. 2.

1 Claim, 3 Drawing Sheets